United States Patent [19]

Fukai et al.

[11] Patent Number: 4,648,685

[45] Date of Patent: Mar. 10, 1987

[54] METHOD OF DRIVING GALVANOMETER MIRROR

[75] Inventors: Nobutaka Fukai; Yuji Ohara; Toshitaka Agano, all of Kanagawa, Japan

[73] Assignee: Fuji Photo Film Co., Ltd., Kanagawa, Japan

[21] Appl. No.: 765,481

[22] Filed: Aug. 14, 1985

[30] Foreign Application Priority Data

Aug. 16, 1984 [JP] Japan ................... 59-170797

[51] Int. Cl.$^4$ ............................. G02B 26/10
[52] U.S. Cl. ..................................... 350/6.6
[58] Field of Search ............... 350/6.1, 6.2, 6.6, 6.9; 324/76 R, 97

[56] References Cited

U.S. PATENT DOCUMENTS 4,307,930  12/1981  Saito ........................... 350/6.6
4,329,011   5/1982  Mori et al. ................. 350/6.6

FOREIGN PATENT DOCUMENTS 1492197  11/1977  United Kingdom .............. 350/6.6

Primary Examiner—John K. Corbin
Assistant Examiner—Loha Ben
Attorney, Agent, or Firm—Sughrue, Mion, Zinn, Macpeak, and Seas

[57] ABSTRACT

A sawtooth voltage waveform for driving a galvanometer mirror is applied until the voltage reaches a peak value exceeding a prescribed voltage value at which the galvanometer mirror is angularly displaced through a maximum angle at one stroke end of reciprocating angular movement thereof. The voltage is then changed from the peak value to the prescribed voltage value after the galvanometer mirror has been angularly displaced through the maximum angle. The voltage is kept at the prescribed voltage value for a time interval to attain a desired period of the reciprocating angular movement of the galvanometer mirror. The voltage may be increased along a ramp or reduced along a fall toward the peak value.

3 Claims, 5 Drawing Figures

METHOD OF DRIVING GALVANOMETER MIRROR

BACKGROUND OF THE INVENTION

1. Field of the Invention

The present invention relates to a method of driving a galvanometer mirror, and more particularly to a method of driving a galvanometer mirror in reciprocating strokes at variable periods.

2. Description of the Prior Art

Galvanometer mirrors have widely been used as light deflectors in various optical scanning devices. As is well known in the art, the galvanometer mirror is angularly moved in reciprocating strokes when a sawtooth current is supplied to drive the galvanometer mirror. When the galvanometer mirror is to be reciprocated at a constant period, the drive current used should be of a sawtooth waveform rising and falling in regular periodic cycles. For two-dimensional scanning of a surface, a light beam is deflected by the galvanometer mirror for scanning the surface in one direction. This scanning mode is referred to as "primary scanning". The surface itself is moved in a direction substantially normal to the main scanning direction. This scanning mode is referred to as "secondary scanning". When it is desired in such two-dimensional scanning to vary the rate or speed of the secondary scanning on a given surface being scanned, it is required to change the period of reciprocating angular movement of the galvanometer mirror.

One conventional way for achieving such a variable period of reciprocating movement of the galvanometer mirror is illustrated in FIG. 3 of the accompanying drawings. A voltage having a sawtooth waveform So is applied for angularly moving a galvanometer mirror in reciprocating strokes. The sawtooth voltage has cyclic peaks or maximum values each limited to a voltage $V_1$ at which the galvanometer mirror is swung or angularly displaced through a maximum angle $\theta_1$ at one end of its reciprocating stroke. The time intervals $T_1$, $T_2$ in which the voltage is kept at $V_1$ are varied to change the times for which the galvanometer mirror remains at the maximum angular displacement, thereby varying the period of reciprocating angular movement of the galvanometer mirror. FIG. 4 illustrates another method in which the minimum values of the sawtooth waveform So are limited to a voltage $V_2$ at which the galvanometer mirror is angularly displaced through a maximum angle $\theta_2$ at the other end of the reciprocating stroke.

The angular displacement of the galvanometer mirror usually has a response delay, due primarily to inertia and friction, with respect to the applied drive voltage as indicated by the dotted lines in FIGS. 3 and 4. Therefore, when the time in which the voltage is kept at $V_1$ or $V_2$ is selected to be the shorter time interval $T_1$ as shown in FIGS. 3 and 4, the galvanometer mirror is caused to swing back before it reaches the maximum displacement $\theta_1$ or $\theta_2$, and never arrives at one stroke end. As a result, the stroke of reciprocating movement of the galvanometer mirror is varied to change the times $t_1$, $t_2$ for which the light beam deflected by the galvanometer mirror is scanned along straight lines, thus making the lengths of the scanning lines irregular.

SUMMARY OF THE INVENTION

It is an object of the present invention to provide a method of driving a galvanometer mirror in reciprocating strokes at variable periods without entailing the difficulties of the conventional driving methods.

According to the present invention, there is provided a method of driving a galvanometer mirror in reciprocating angular movement by supplying a drive current generated by a sawtooth voltage waveform, the method comprising the steps of applying the sawtooth voltage waveform until the voltage reaches a peak value exceeding a prescribed voltage value at which said galvanometer mirror is angularly displaced through a maximum angle at one stroke end of the reciprocating angular movement thereof, changing the voltage from said peak value to said prescribed voltage value after said galvanometer mirror has been angularly displaced through said maximum angle, and keeping the voltage at said prescribed voltage value for a time interval to attain a desired period of the reciprocating angular movement of said galvanometer mirror. The voltage may be increased along a ramp or reduced along a fall toward the peak value.

By changing the time interval for which the galvanometer mirror is held at maximum angular displacement, the galvanometer mirror can be driven in varied periods of reciprocating movement in constant strokes without varying the linear scanning time. Therefore, surfaces can be optically scanned in a wide range of variable scanning periods.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 5:
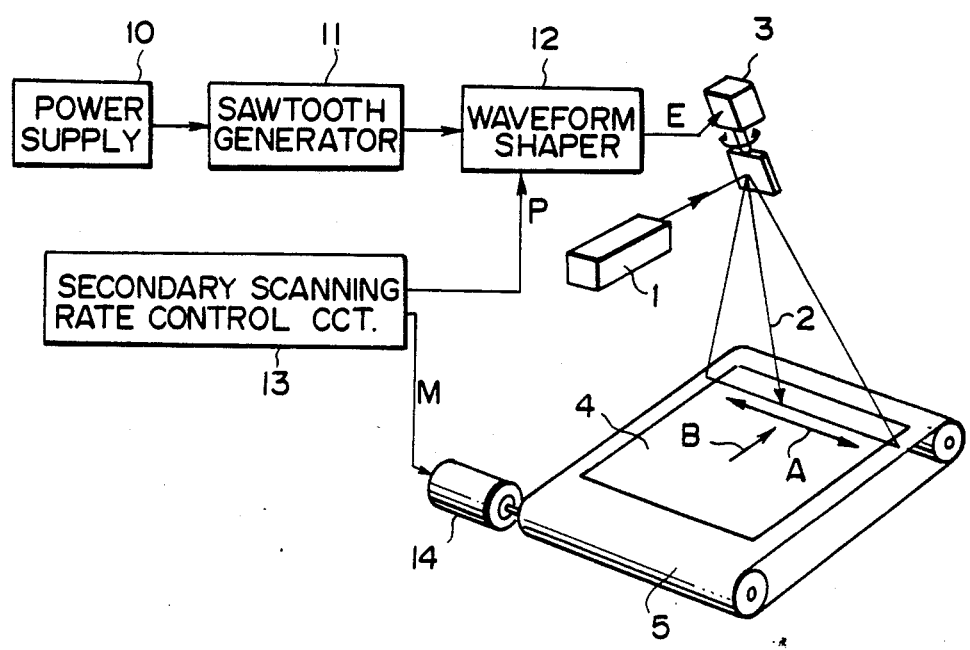
FIG. 5 is a diagram, partly shown in block form, of an arrangement for carrying out the methods of the present invention.

FIG. 5 shows an arrangement for effecting a method of the present invention. A scanning light beam 2 emitted from a beam generator 1 such as a laser source falls on a known galvanometer mirror 3 which is angularly-displaced back and forth to deflect the scanning light beam 2. The scanning light beam 2 as deflected scans a sheet 4 in the directions of the arrow A (primary scanning). The sheet 4 being scanned is moved as by an endless belt 5 in the direction of the arrow B normal to the directions of the arrow A (secondary scanning), the endless belt 5 being driven by an endless belt drive motor 14. The sheet 4 is therefore two-dimensionally scanned by the scanning light beam 2.

Figure 1:
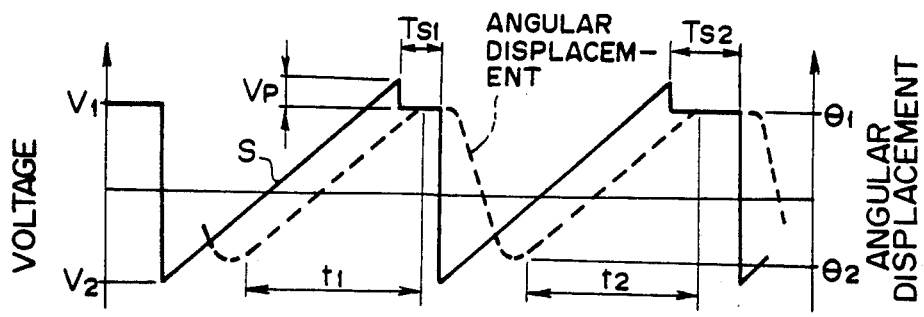
FIGS. 1 and 2 are diagrams showing the waveforms of voltages applied to drive a galvanometer mirror and responsive angular displacements of the galvanometer mirror in methods according to different embodiments of the present invention.

Now, assume that the rate of the secondary scanning is changed. If only the speed of travel of the endless belt 5 should be varied, the scanning lines on the sheet 4 would be spaced at different spacings. To avoid this, it is required to vary the time intervals for which the galvanometer mirror 3 remains stopped at its maximum angular displacement for changing the period of reciprocating movement of the galvanometer mirror 3. To meet such a requirement, the galvanometer mirror 3 is driven by a drive current E produced via a waveform shaper 12 from a sawtooth generator 11 energized by a power supply 10. FIG. 1 shows the waveform of a voltage S for generating such a drive current E. The voltage waveform S is principally a sawtooth waveform produced by the sawtooth generator 11. However, the sawtooth waveform is processed by the waveform shaper 12 such that the voltage ramps toward each cyclic maximum or positive peak value having a voltage $(V_1+V_P)$ and after the maximum value the voltage drops to a voltage value $V_1$ at which the galvanometer mirror 3 remains angularly displaced by a maximum angle $\theta_1$ for a continuous time interval $T_{S1}$ or $T_{S2}$, followed by a sharp fall of the original sawtooth waveform.

The time intervals $T_{S1}$, $T_{S2}$ are controlled by a period signal P applied to the waveform shaper 12 by a secondary scanning rate control circuit 13. By changing the time intervals $T_{S1}$, $T_{S2}$, the times in which the galvanometer mirror 3 is kept at the maximum angular displacement $\theta_1$ can be varied to change the period of reciprocating movement of the galvanometer mirror 3. Since each maximum peak value is higher than the voltage $V_1$ by the voltage $V_P$, the galvanometer mirror 3 reaches the maximum angular displacement $\theta_1$ without fail in each cycle even if the galvanometer mirror 3 has a response delay in its angular displacement with respect to the supplied current. Therefore, the strokes of reciprocating movement of the galvanometer mirror 3, and hence the times $t_1$, $t_2$ in which the sheet 4 is linearly scanned are kept constant, so that the scanning lengths remain constant.

The voltage $V_P$ should be selected to allow the galvanometer mirror 3 to reach the maximum angular displacement $\theta_1$ even at the shortest period of reciprocating movement of the galvanometer mirror, dependent on the characteristics of the galvanometer mirror 3 and the required shortest period of reciprocating movement, i.e., the minimum value of the time interval $T_S$ during which the voltage is kept at $V_1$.

As an alternative, the maximum angular displacement $\theta_1$ of the galvanometer mirror 3 may be detected and a detection signal may be applied to the waveform shaper 12, whereupon the waveform shaper 12 may stop the linear voltage increase and cause the voltage to fall.

The endless belt drive motor 14 is supplied by the secondary scanning rate control circuit 13 with a speed signal M representing a rate of secondary scanning which is inversely proportional to the period of reciprocating movement of the galvanometer mirror 3. The endless belt drive motor 14 then drives the endless belt 5 at a speed dependent on the speed signal M to keep secondary scanning pitches or spacings (scanning line intervals) constant on the sheet 4.

Figure 2:
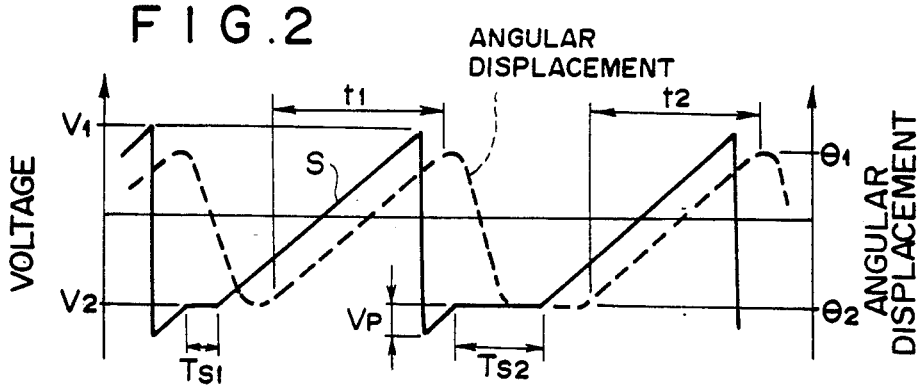
Figure 3:
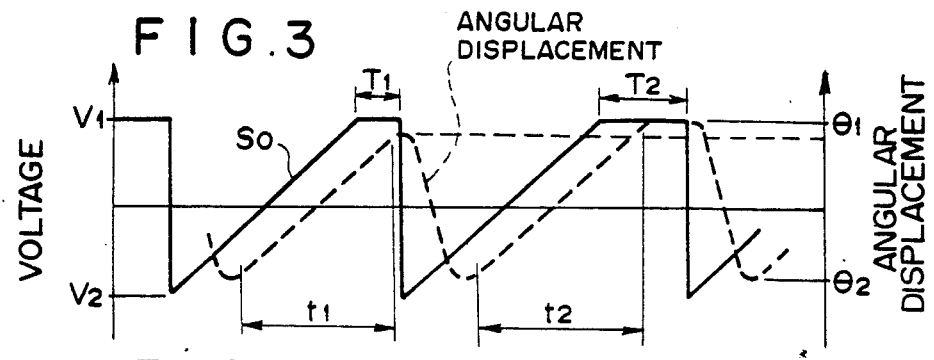
FIGS. 3 and 4 are diagrams of the waveforms of voltages applied to drive a galvanometer mirror and responsive angular displacements of the galvanometer mirror in conventional methods.
Figure 4:
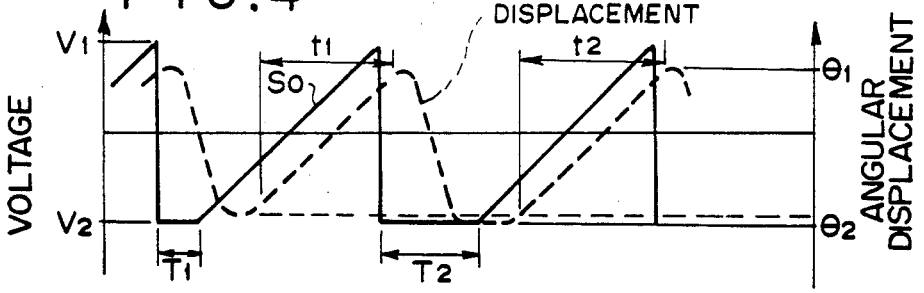

FIG. 2 shows a method according to another embodiment of the present invention. A sawtooth voltage waveform S for generating a drive current for the galvanometer mirror 3 has minimum or negative peak values each having a voltage $(V_2+V_P)$ which exceeds, by $V_P$, a voltage $V_2$ at which the galvanometer mirror 3 is angularly displaced by a maximum angle $\theta_2$ at one stroke end.

While the illustrated sawtooth waveforms employed in the methods of the present invention have linear ramps and falls, slightly curved sawtooth waveforms may also be used for driving the galvanometer mirror 3.

Although certain preferred embodiments have been shown and described, it should be understood that many changes and modifications may be made therein without departing from the scope of the appended claims.

We claim:

1. A method of driving a galvanometer mirror in reciprocating angular movement by supplying a drive current generated by a sawtooth voltage waveform, comprising the steps of:
   (i) applying the sawtooth voltage waveform until the voltage reaches a peak value exceeding a prescribed voltage value at which said galvanometer mirror is angularly displaced through a maximum angle at one stroke end of the reciprocating angular movement thereof;
   (ii) changing the voltage from said peak value to said prescribed voltage value after said galvanometer mirror has been angularly displaced through said maximum angle; and
   (iii) keeping the voltage at said prescribed voltage value for a time interval to attain a desired period of the reciprocating angular movement of said galvanometer mirror.

2. A method according to claim 1, wherein the voltage is increased along a ramp of the waveform toward said peak value.

3. A method according to claim 1, wherein the voltage is reduced along a fall of the waveform toward said peak value.

* * * * *